(12) United States Patent
Loetter

(10) Patent No.: US 9,264,851 B2
(45) Date of Patent: Feb. 16, 2016

(54) DETERMINING THE LOCATION OF A MOBILE TERMINAL IN THE PRESENCE OF A REPEATER

(71) Applicant: Nextivity, Inc., San Diego, CA (US)

(72) Inventor: Michiel Petrus Loetter, San Diego, CA (US)

(73) Assignee: Nextivity, Inc., San Diego, CA (US)

( * ) Notice: Subject to any disclaimer, the term of this patent is extended or adjusted under 35 U.S.C. 154(b) by 135 days.

(21) Appl. No.: 14/022,719

(22) Filed: Sep. 10, 2013

(65) Prior Publication Data

US 2014/0073351 A1     Mar. 13, 2014

Related U.S. Application Data

(60) Provisional application No. 61/699,260, filed on Sep. 10, 2012.

(51) Int. Cl.
*H04W 4/02*     (2009.01)
*H04W 4/22*     (2009.01)

(52) U.S. Cl.
CPC .. *H04W 4/02* (2013.01); *H04W 4/22* (2013.01)

(58) Field of Classification Search
CPC .................................. H04W 4/02; H04W 4/22
USPC .................. 455/11.1, 16, 13.1, 456.2, 456.5, 455/456.1–457; 370/226, 274, 279, 315
See application file for complete search history.

(56) References Cited

U.S. PATENT DOCUMENTS

| | | | |
|---|---|---|---|
| 2006/0155826 A1* | 7/2006 | Hyun ...................... | G01S 5/021 709/218 |
| 2009/0005061 A1* | 1/2009 | Ward ...................... | G01S 5/021 455/456.1 |
| 2009/0017837 A1* | 1/2009 | Kim, II ................. | H04W 64/00 455/456.1 |
| 2012/0003995 A1* | 1/2012 | Ishii ...................... | G01S 5/021 455/456.1 |

* cited by examiner

*Primary Examiner* — Kashif Siddiqui
*Assistant Examiner* — Ather Mohiuddin
(74) *Attorney, Agent, or Firm* — Mintz Levin Cohn Ferris Glovsky and Popeo, P.C.

(57) ABSTRACT

Data characterizing signal propagation times between a mobile user and a plurality of base stations can be received. A dominant signal propagation path between the mobile user and at least one of the plurality of base stations is via a repeater. A valid mobile user position solution is determined by searching a domain of possible mobile user position solutions using the received data and a predetermined repeater time delay. The valid mobile user position solution can be provided. Related apparatus, systems, techniques, and articles are also described.

20 Claims, 6 Drawing Sheets

DETERMINING THE LOCATION OF A MOBILE TERMINAL IN THE PRESENCE OF A REPEATER

RELATED APPLICATIONS

This application claims priority to U.S. Provisional Patent Application No. 61/699,260, filed Sep. 10, 2012, the content of which is hereby incorporated by reference in its entirety.

TECHNICAL FIELD

The subject matter described herein relates to wireless networks, and more particularly to determining a location of a mobile device in the presence of a wireless repeater.

BACKGROUND

Wireless networks often must be able to determine the location of mobile users (UE's or mobile devices) on demand. For instance, sometime wireless networks must determine location to support various functionalities such as providing user location to emergency services, such as for Enhanced-911. Enhanced-911 or E-911 is a system used in North America that links emergency callers with the appropriate public resources. E-911 tries to automatically associate a location with the origin of the call. This location may be a physical address or other geographic reference information such as X/Y map coordinates. The caller's telephone number can be used in various ways to derive a location that can be used to dispatch police, fire, emergency medical and other response resources. Automatic location of the emergency makes it quicker to locate the required resources during fires, break-ins, kidnappings, and other events where communicating one's location is difficult or impossible. In addition to E-911, other location services can include location-aware advertising and family-member-location services. Various conventional methods exist to perform such location determination, including:
  Proximity sensing and/or Cell-ID based methods;
  Angulation, where the angle of arrival of a UE signal at multiple base stations are used to determine the UE position;
  Circular lateration, where a Round-Trip-Time (RTT) of signals from at least 3 base stations are used to determine a UE's position;
  Assisted Global Positioning System (A-GPS), is a system that can under certain conditions improve the startup performance, or time-to-first-fix (TTFF), of a GPS satellite-based positioning system; and
  Enhanced Observed Time Difference of Arrival (E-OTDA) techniques where hyperbolic lateration can be used to locate a UE based on measurements of time difference in arrival of signals to a UE from at least three base stations.

However, techniques that rely on the flight time of a signal to perform the location determination are subject to errors when a repeater is part of the network deployment.

SUMMARY

In an aspect, data characterizing signal propagation times between a mobile user and a plurality of base stations can be received. A dominant signal propagation path between the mobile user and at least one of the plurality of base stations is via a repeater. A valid mobile user position solution is determined by searching a domain of possible mobile user position solutions using the received data and a predetermined repeater time delay. The valid mobile user position solution can be provided.

In yet another aspect, a system includes a plurality of base stations in communication with a mobile device, a repeater; and a computing system. The computing system is configured to receive data characterizing signal propagation times between the mobile device and the plurality of base stations. The computing system is configured to determine a valid mobile device position solution by searching a domain of possible mobile device position solutions using the received data and a predetermined repeater time delay and to provide the valid mobile device position solution. A dominant signal propagation path between the mobile device and at least one of the plurality of base stations can be via the repeater.

One or more of the following features can be included. For example, the data characterizing signal propagation times can include a return trip time. A time difference of arrival can be determined for the plurality of base stations. The valid mobile user position can be determined based on a geometrical intersection solution to three or more constant delay circles concentric to a respective base station. A mobile user position can be valid when constant delay circles intersect over a region of less than a predetermined area. Providing can include one or more of transmitting, displaying, and persisting. Whether the dominant signal propagation path between the mobile user and at least one of the plurality of base stations is via the repeater can be determined. Whether the predetermined repeater delay is less than one or more of the received signal propagation times can be determined.

Implementations of the current subject matter can include, but are not limited to, systems and methods consistent including one or more features are described as well as articles that comprise a tangibly embodied machine-readable medium operable to cause one or more machines (e.g., computers, mobile communication devices, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

To address these and potentially other issues with currently available solutions, methods, systems, articles of manufacture, and the like consistent with one or more implementations of the current subject matter can, among other possible advantages, provide a system and method to determine the location of a UE in the presence of a known repeater delay. A repeater can be an electronic device that receives a signal and retransmits it at a higher level or higher power, or onto the other side of an obstruction, so that, for example, the signal can cover longer distances. A repeater can have a specific delay ($T_R$), which changes the flight time of a signal and can lead to the UE position being incorrectly calculated.

Figure 1:
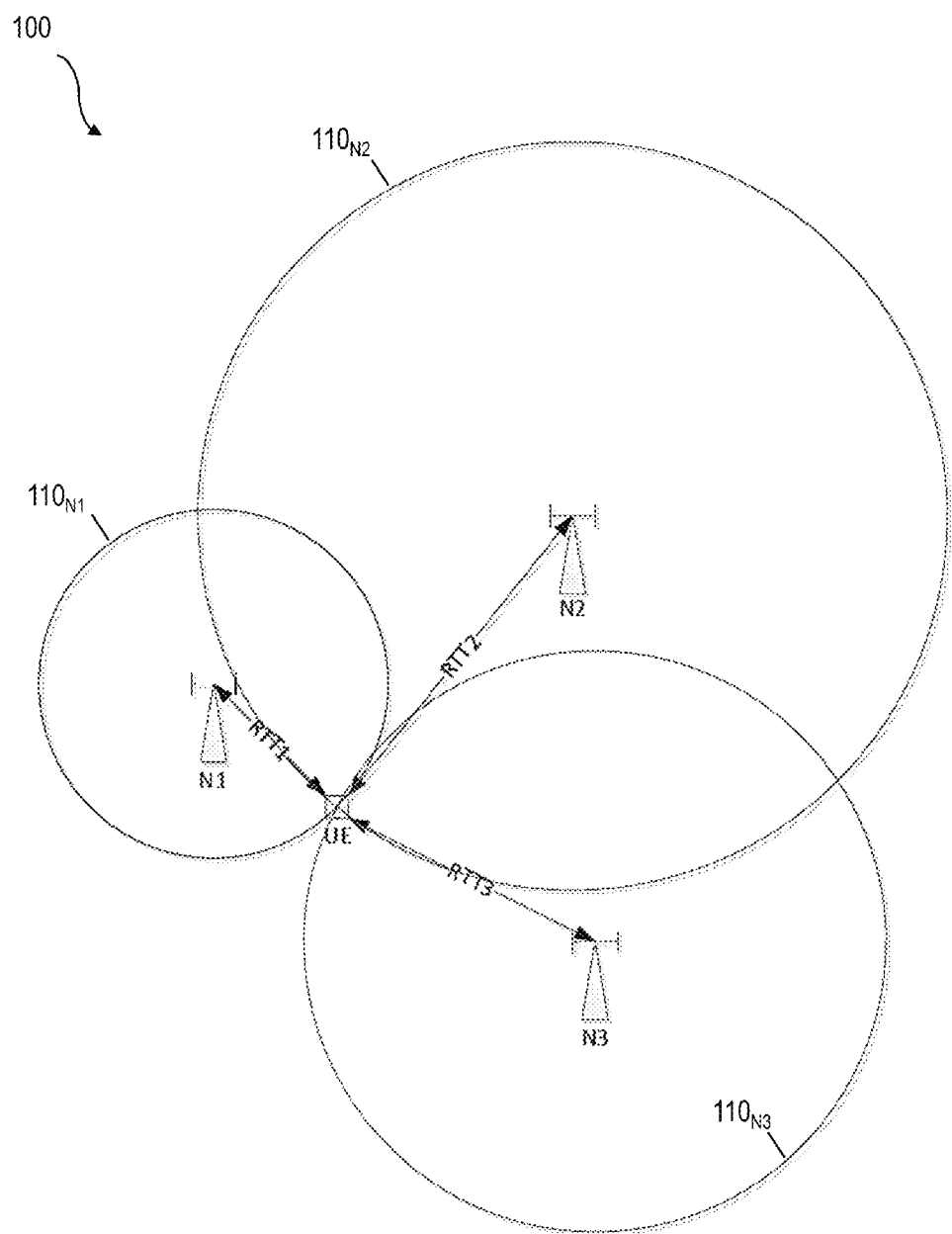
FIG. 1 is a diagram of a cellular network and UE.

Consider the diagram shown in FIG. 1. FIG. 1 is a diagram of a cellular network 100 and UE. The cellular network 100 can include a radio network distributed over land areas called cells, each served by at least one fixed-location transceiver, known as a cell site or base station (e.g., N1, N2, and N3). In a cellular network, each cell can use a different set of frequencies from neighboring cells, to avoid interference and provide guaranteed bandwidth within each cell. The UE that can be located at an arbitrary position in one or more cells and can "hear" or "see" (e.g., communicate with) 3 or more base stations (illustrated as N1, N2 and N3). In order to determine a position of the UE, either the cellular network 100 or the UE can measure a Round Trip Time (RTT) and/or an observed time difference of arrival (TDOA). In FIG. 1, the RTT to each respective base station is denoted by RTT1, RTT2, and RTT3. The location of each base station can be known or predetermined.

RTT is the time it takes a signal to propagate from a base station (e.g., N1, N2, or N3) to the UE and back to the same base station (e.g., N1, N2, or N3). Alternatively, the RTT can be the time it takes a signal to propagate from the UE to a base station (e.g., N1, N2, or N3), and back to the UE. The cellular network 100 can measure or observe the RTT, for example, in the context of the 3GPP standard TS25.215, via the cellular network 100 instructing the UE to perform a UE receive-transmit (Rx-Tx) time difference measurement.

Figure 2:
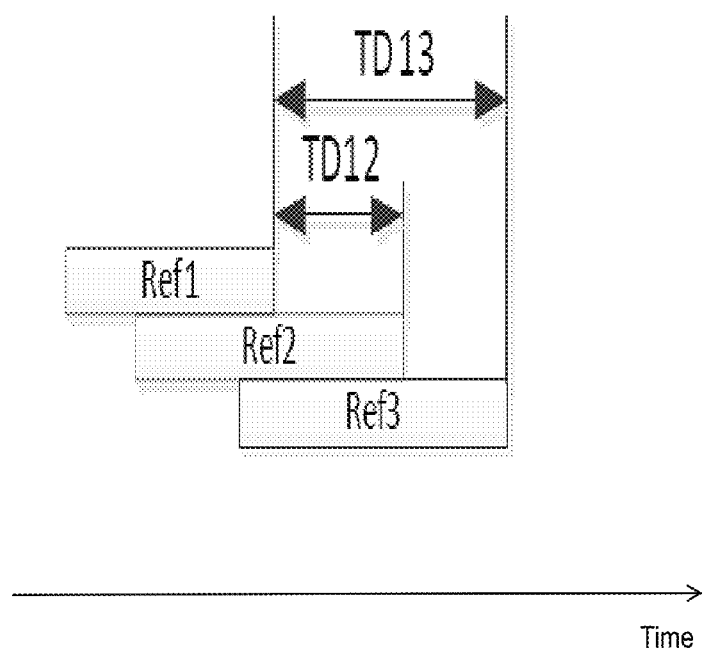
FIG. 2 is a diagram illustrative of calculating example time difference of arrival and shows three example reference signals that can be received by the mobile user/device.

TDOA is the time difference of arrival (or distance) between a UE and two or more base stations at known locations with a signal that is broadcast at known times. To perform a TDOA measurement, the UE can receive a reference signal from all three base stations (e.g., N1, N2, and N3) and calculate a difference in time between receiving the signal from one of the base stations to each of the other base stations. FIG. 2 is a diagram illustrative of calculating example TDOA and shows three example reference signals (e.g., ref1, ref2, and ref3) that can be received by the UE (from, e.g., N1, N2, and N3, respectively). The UE can calculate a difference in time (e.g., TD13, and TD12) between the received signals (e.g., ref1, ref2, and ref3). The cellular network 100 can measure or observe the TDOA, for example, in the context of the 3GPP standard TS25.215, via the network instructing the UE to perform a SFN-SFN observed time difference measurement.

In a location determining system without a repeater, the position of the UE can be determined using either the RTT or the TDOA measurements described above to calculate the position of the UE using circular lateration (in the case of RTT) or hyperbolic lateration (in the case of TDOA). In circular lateration, a circle can be drawn around the base station with radius equal to the distance the signal traveled in half of the RTT (the circle need not actually be drawn, and the circle can be abstract and can be represented by an origin and a radius/distance). If three or more base stations can be heard, these constant delay circles should geometrically intersect in a single point, which can denote the location of the UE. For example, in FIG. 1, constant delay circles $110_{N1}$, $110_{N2}$, and $110_{N3}$ are shown around base stations N1, N2, and N3, respectively. Furthermore, constant delay circles $110_{N1}$, $110_{N2}$, and $110_{N3}$, intersect at UE's position. In hyperbolic lateration, hyperboloids can be used instead of circles.

Figure 3:
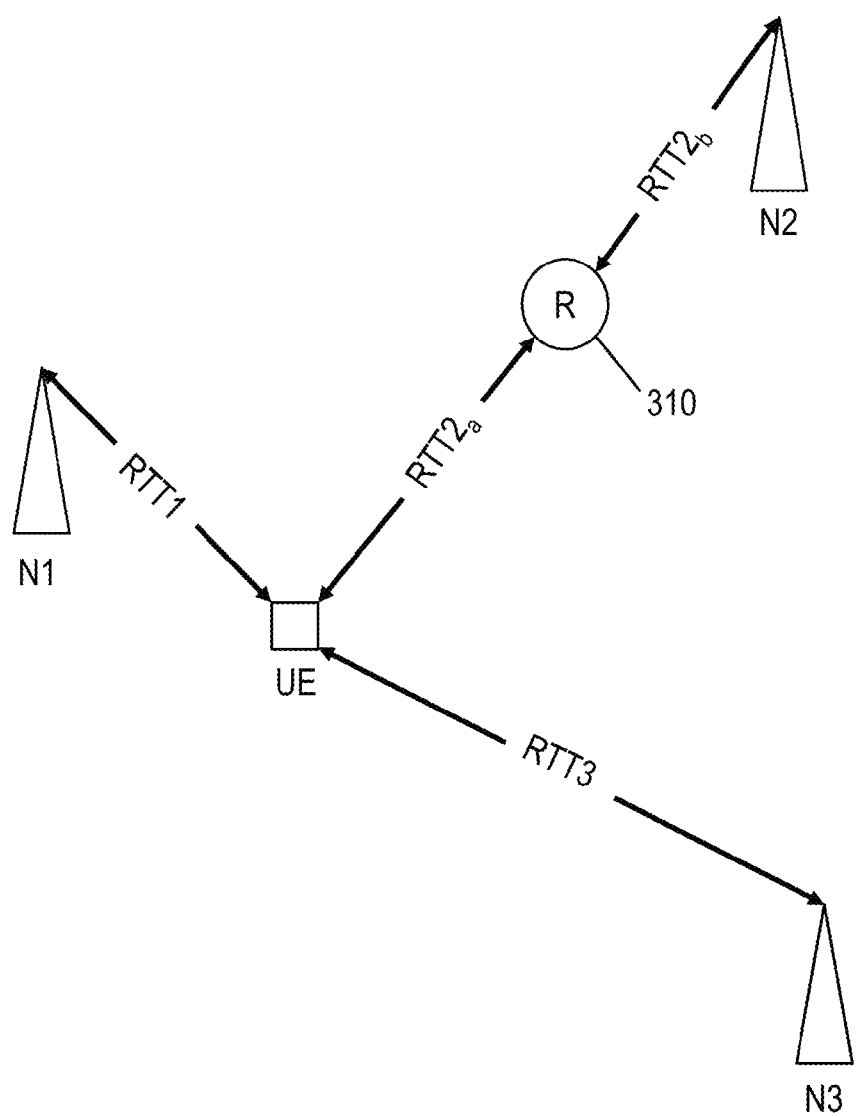
FIG. 3 is a diagram illustrating the example cellular system of FIG. 1, with a repeater between the mobile user/device and the second base station (N2)

When a repeater is introduced into the network, for example, between UE and anyone of N1, N2, and/or N3, the RTT and TDOA measurements can be influenced if the dominant signal propagation path between a base station and the UE is via the repeater. FIG. 3 is a diagram illustrating the example cellular system 100 of FIG. 1, with a repeater 310 between UE and N2. The signal propagation time between UE and N2 can be extended by the repeater delay. For example, observed RTT2 can include the round trip time between UE and the repeater 310 (denoted as $RTT2_a$), plus the round trip time between the repeater 310 and the base station N2 (denoted as $RTT2_b$), plus a repeater delay ($T_R$). The effect of the repeater delay ($T_R$) makes it seem as if the UE is further away from the base station than it actually is.

Figure 4:
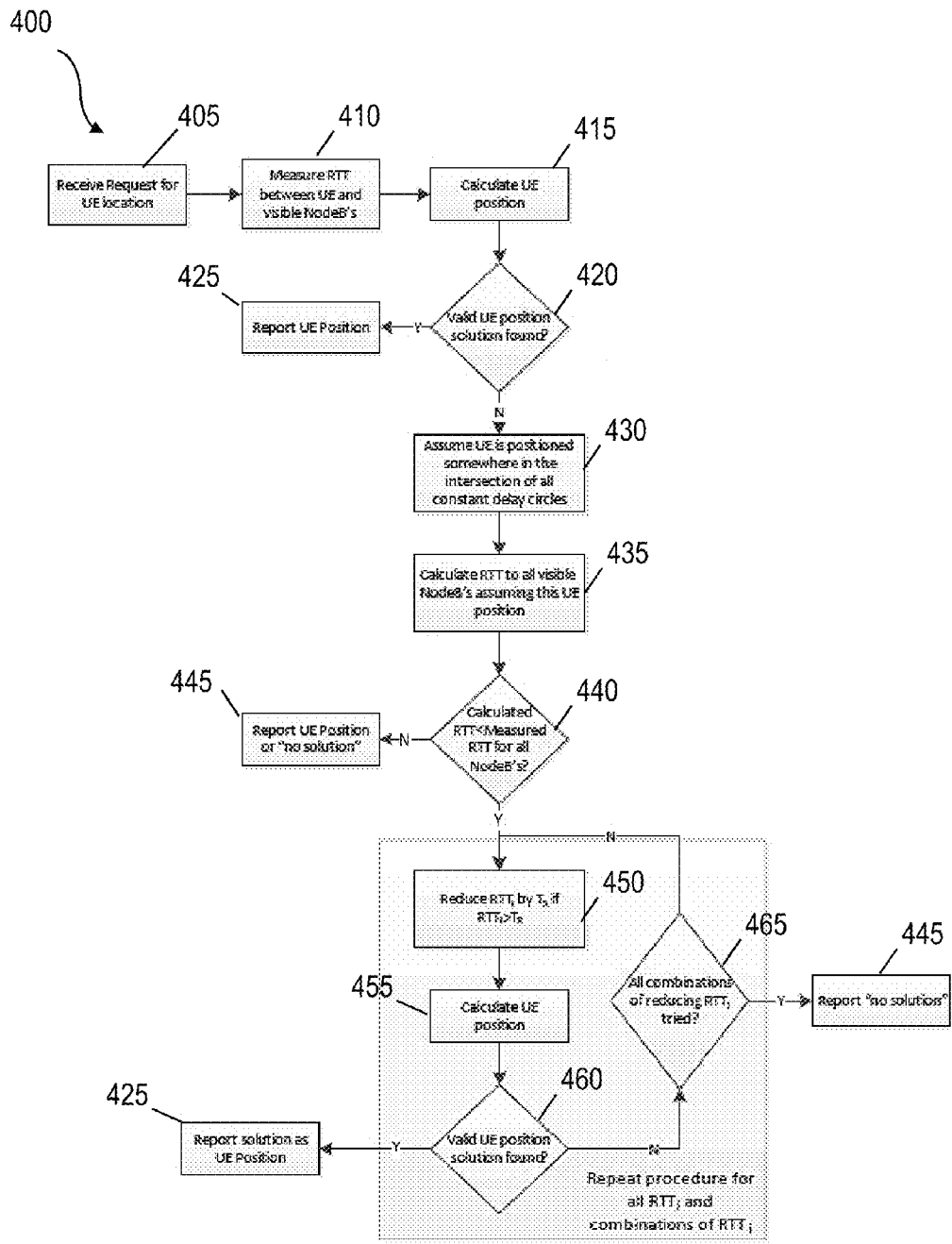
FIG. 4 is a process flow diagram illustrating an example implementation of estimating a location of a mobile user/device in a network with a repeater using return trip time measurements.

This additional repeater delay can be taken into account in order to accurately estimate the location of a UE. FIG. 4 is a process flow diagram 400 illustrating an example implementation of estimating a location of a UE in a network 100 with a repeater 310 using RTT measurements to calculate a position of the UE (via circular lateration). In the example implementation described in FIG. 4, the UE is in communication with three base stations. However, the process can extend for cases where more than three base stations are "seen" by the UE.

At 405, a request for a UE location can be received. For example, the request can be received at a cellular network 100, UE, or other device. For example, the request can originate from a UE (e.g., by a user or software application residing on the UE), E-911 service, location-aware advertising service, and/or family-member-location service.

At 410, RTT can be computed between the UE and each visible base station (also referred to as a NodeB). The RTT can be computed as described above.

At 415, the UE position can be calculated. For example, by circular lateration where a geometrical intersection solution to three or more constant delay circles concentric to each respective base station may be determined.

At 420, the calculated UE position is tested to determine whether the position is a valid position. A position is valid when all constant delay circles intersect at a single point (or close to it). A position could be valid when the constant delay circles intersect over a small region to account for differences and errors in the RTT measuring process.

If the UE position calculated at 415 is deemed valid at 420, then at 425 the calculated UE position is provided or reported. The providing or reporting can include transmitting, storing, and displaying. For example, the position can be displayed on a display device of the UE, can be transmitted to a remote location (e.g., a server), and can be stored in local memory.

Figure 5:
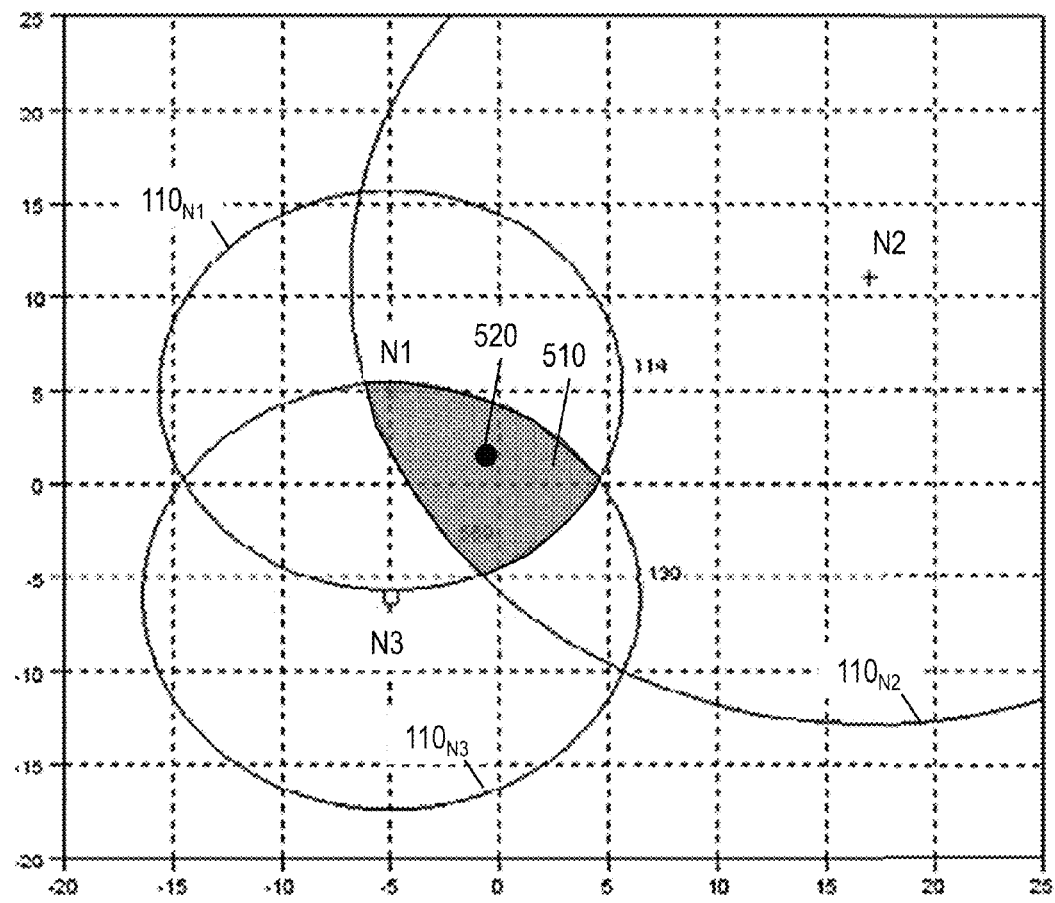
FIG. 5 is a diagram of an example cellular network showing three example base stations and corresponding constant delay circles.

If the UE position calculated at 415 is deemed invalid at 420, then at 430 the true UE position is assumed to reside somewhere in a region defined by an intersection of all constant delay circles. For example a UE position can be estimated to be at the center of mass of the region defined by the intersection of all the constant delay circles. FIG. 5 is a diagram of an example cellular network 100 showing three example base stations N1, N2, and N3, and constant delay circles $110_{N1}$, $110_{N2}$, and $110_{N3}$. The constant delay circles do not intersect at a single point, and therefore no valid UE position can be determined without compensating for repeater delay ($T_R$). The true UE position can be assumed to reside within the region (denoted by 510) defined by the intersection of the three constant delay circles $110_{N1}$, $110_{N2}$, $110_{N3}$. An estimated position 520 of the UE can be the center of mass of the intersection of all constant delay circles.

Referring again to FIG. 4, at 435, RTT to each base station can be calculated using the UE position estimated at 430. The RTT to each base station can be calculated because the positions of each base station are known or predetermined, and therefore the distance between the estimated UE position and each base station can be calculated.

At 440, it can be determined if the RTT for each base station calculated at 435 is less than the RTT for each base station measured at 410. If a repeater was present when the RTT for each base station was measured at 410, the RTT for at least one base station calculated at 435 will be less than the RTT for a corresponding base station measured at 410. Thus, at 440, the presence of a repeater can be determined.

If there is no repeater present, then at 445, a "no solution" or a characterizing of the possible solution space can be reported or provided.

If there is a repeater present, then, at 450, one of the RTT measured at 410 (e.g., $RTT_i$, where i denotes the $i^{th}$ base station the UE can hear) can be reduced by the known predetermined repeater delay ($T_R$).

A new position can be calculated using the RTT modified at 455. The position can be calculated using circular lateration as described above.

At 460, the newly calculated UE position can be tested to determine whether the position is a valid position. As described above, a position is valid when all constant delay circles intersect at a single point (or close to it). A position could be valid when the constant delay circles intersect over a small region to account for differences and errors in the RTT measuring process.

If a valid solution is found at 460, the solution may be reported at 425.

If no valid solution is found at 460, then it can be determined whether all combinations of reducing $RTT_i$ has been tried. If all combinations have been tried, then a "no solution" can be reported at 445. If all combinations of reducing $RTT_i$ has not been attempted, then the process can return to step 450. The process (450, 455, 460, and 465) can iterate until either a solution is found or all possible combinations of reducing $RTT_i$ is tried. In this manner, the possible UE position solution space or domain of solutions can be explored to find a measurement or measurements that were corrupted by the presence of a repeater. For example, in the case of three base stations, the following possibilities of corrupt measurements exist and can be considered as possible solutions: RTT1, RTT2, RTT3, RTT1 and RTT2, RTT1 and RTT3, RTT2 and RTT3, RTT1 and RTT2 and RTT3.

Additionally, any RTT less than the repeater delay could not be corrupted by a repeater and hence those possibilities can be discarded to speed up the process of finding a solution.

Figure 6:
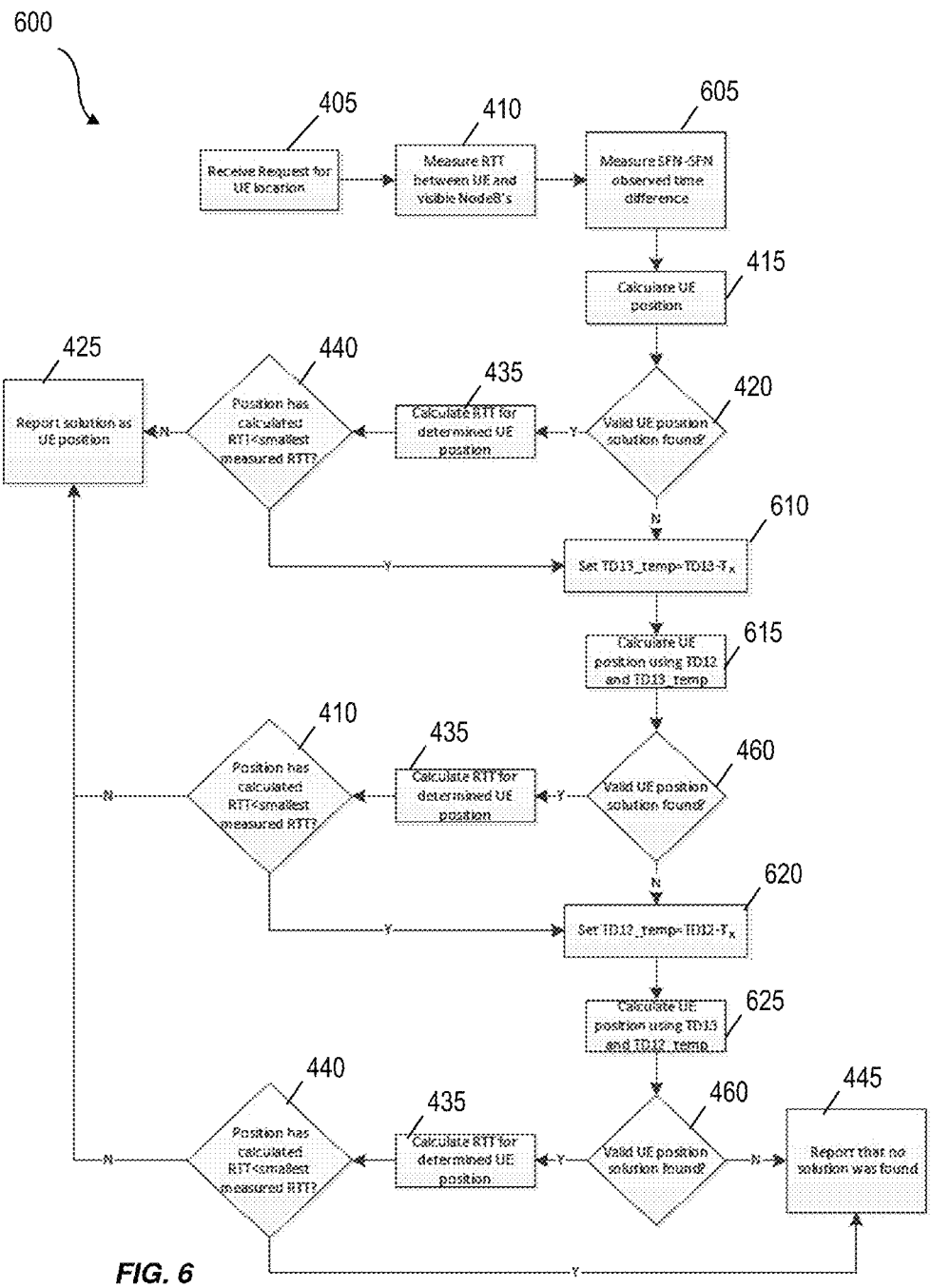
FIG. 6 is a process flow diagram illustrating an example implementation of estimating a location of a UE in a network with a repeater using time difference of arrival measurements to calculate a position of the mobile user/device.

FIG. 6 is a process flow diagram 600 illustrating an example implementation of estimating a location of a UE in a network 100 with a repeater 310 using TDOA measurements to calculate a position of the UE. FIG. 6 includes some of the steps as described in FIG. 4, and also computes the TDOA at 605. When a valid solution is not immediately found (e.g., in 415, and 420), the TDOA for each pair of base stations can be modified by the known repeater time delay ($T_R$) at 610 and 620, and the UE position can be calculated using the TDOA modified in 610 and 620, respectively at 615 and 625.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
receiving data characterizing signal propagation times between a mobile user and a plurality of base stations, wherein a dominant signal propagation path between the mobile user and at least one of the plurality of base stations is via a repeater;
determining a valid mobile user position solution by searching a domain of possible mobile user position solutions using the received data and a predetermined repeater time delay to identify one or more of the signal propagation times corresponding to a measurement corrupted by a presence of the repeater; and
providing the valid mobile user position solution.

2. The computer-implemented method of claim 1, wherein the data characterizing signal propagation times include return trip time (RTT).

3. The computer-implemented method of claim 1, further comprising determining a time difference of arrival (TDOA) for the plurality of base stations.

4. The computer-implemented method of claim 1, wherein the valid mobile user position is determined based on a geometrical intersection solution to three or more constant delay circles concentric to a respective base station.

5. The computer-implemented method of claim 1, wherein a mobile user position is valid when constant delay circles intersect over a region of less than a predetermined area.

6. The computer-implemented method of claim 1, wherein providing comprises one or more of transmitting, displaying, and persisting.

7. The computer-implemented method of claim 1, further comprising determining whether the dominant signal propagation path between the mobile user and at least one of the plurality of base stations is via the repeater.

8. The computer-implemented method of claim 1, further comprising determining whether the predetermined repeater delay is less than one or more of the received signal propagation times.

9. A system comprising:
at least one data processor;
memory storing instructions which, when executed by the at least one data processor, causes the at least one data processor to perform operations comprising:
receiving data characterizing signal propagation times between a mobile user and a plurality of base stations, wherein a dominant signal propagation path between the mobile user and at least one of the plurality of base stations is via a repeater;
determining a valid mobile user position solution by searching a domain of possible mobile user position solutions using the received data and a predetermined repeater time delay to identify one or more of the signal propagation times corresponding to a measurement corrupted by a presence of the repeater; and
providing the valid mobile user position solution.

10. The system of claim 9, wherein the data characterizing signal propagation times include return trip time (RTT).

11. The system of claim 9, the operations further comprising determining a time difference of arrival (TDOA) for the plurality of base stations.

12. The system of claim 9, wherein the valid mobile user position is determined based on a geometrical intersection solution to three or more constant delay circles concentric to a respective base station.

13. The system of claim 9, wherein a mobile user position is valid when constant delay circles intersect over a region of less than a predetermined area.

14. The system of claim 9, wherein providing comprises one or more of transmitting, displaying, and persisting.

15. The system of claim 9, the operations further comprising determining whether the dominant signal propagation path between the mobile user and at least one of the plurality of base stations is via the repeater.

16. The system of claim 9, the operations further comprising determining whether the predetermined repeater delay is less than one or more of the received signal propagation times.

17. A system comprising:
a plurality of base stations in communication with a mobile device;
a repeater; and
a computing system configured to receive data characterizing signal propagation times between the mobile device and the plurality of base stations; determine a valid mobile device position solution by searching a domain of possible mobile device position solutions using the received data and a predetermined repeater time delay to identify one or more of the signal propagation times corresponding to a measurement corrupted by a presence of the repeater; and provide the valid mobile device position solution;

wherein a dominant signal propagation path between the mobile device and at least one of the plurality of base stations is via the repeater.

18. The system of claim 17, wherein the data characterizing signal propagation times include return trip time (RTT).

19. The system of claim 17, the operations further comprising determining a time difference of arrival (TDOA) for the plurality of base stations.

20. The system of claim 17, wherein the valid mobile device position is determined based on a geometrical intersection solution to three or more constant delay circles concentric to a respective base station.

* * * * *